(12) United States Patent
Imai et al.

(10) Patent No.: US 8,190,791 B2
(45) Date of Patent: May 29, 2012

(54) IMAGE FORMING APPARATUS, DEVICE MANAGING APPARATUS, DEVICE MANAGING SYSTEM, STATUS ACQUIRING METHOD, DEVICE MANAGING METHOD, AND COMPUTER PROGRAM

(75) Inventors: Takuya Imai, Tokyo (JP); Yukiko Sahashi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 696 days.

(21) Appl. No.: 11/898,708

(22) Filed: Sep. 14, 2007

(65) Prior Publication Data

US 2008/0071941 A1    Mar. 20, 2008

(30) Foreign Application Priority Data

Sep. 19, 2006    (JP) ................................. 2006-253409

(51) Int. Cl.
*G06F 3/00* (2006.01)
(52) U.S. Cl. ......................................................... 710/15
(58) Field of Classification Search ...................... 710/15
See application file for complete search history.

(56) References Cited

U.S. PATENT DOCUMENTS

| | | | | |
|---|---|---|---|---|
| 5,331,642 A * | 7/1994 | Valley et al. | .................. | 714/705 |
| 6,453,268 B1 * | 9/2002 | Carney et al. | .................. | 702/186 |
| 6,493,517 B1 * | 12/2002 | Hanson | ........................... | 399/11 |
| 2003/0025935 A1 * | 2/2003 | Somei | .......................... | 358/1.15 |
| 2003/0131083 A1 | 7/2003 | Inui et al. | | |
| 2004/0205140 A1 | 10/2004 | Ikeno | | |
| 2005/0018236 A1 * | 1/2005 | Shirai et al. | .................. | 358/1.14 |
| 2005/0254829 A1 | 11/2005 | Lee et al. | | |
| 2006/0031906 A1 | 2/2006 | Kaneda | | |
| 2009/0052266 A1 * | 2/2009 | Askar et al. | .................... | 365/212 |

FOREIGN PATENT DOCUMENTS

| | | |
|---|---|---|
| EP | 0 952 521 | 10/1999 |
| JP | 2004-234645 A | 8/2004 |
| JP | 2005-115920 A | 4/2005 |
| JP | 2006-228099 | 8/2006 |

OTHER PUBLICATIONS

European Search Report dated Jan. 16, 2009.
Office Action issued Sep. 15, 2011, in corresponding European Patent Application No. 07 253 655.0.

* cited by examiner

*Primary Examiner* — Henry Tsai
*Assistant Examiner* — Juanito Borromeo
(74) *Attorney, Agent, or Firm* — Harness, Dickey & Pierce, P.L.C.

(57) ABSTRACT

An image forming apparatus is connected to a device managing apparatus via a network. The image forming apparatus acquires its own current status and estimates an estimated status. The estimated status is a status following the current status. The image forming apparatus transmits the current status, the estimated status, and a transition condition that governs a change of status from the current status to the estimated status to a device managing apparatus.

9 Claims, 11 Drawing Sheets

205

| PREVIOUS STATUS/ CURRENT STATUS | | ON-LINE | OFF-LINE | REBOOTING | CHANGING NETWORK SETTING | UPDATING SOFTWARE |
|---|---|---|---|---|---|---|
| 1 | ON-LINE | 0→1, 6 | 0→2, 6 | 10→1, 7 | 10→1, 7 | 20→1, 7 |
| 2 | OFF-LINE | 0→1, 6 | 0→2, 6 | 10→1, 7 | 10→1, 7 | 20→1, 7 |
| 3 | REBOOTING | 0→1, 7 | 0→6, 6 | 10→1, 7 | 0→7, 7 | 20→1, 7 |
| 4 | NETWORK SETTING CHANGE | 0→1, 7 | 0→6, 6 | 10→1, 7 | 10→1, 7 | 20→1, 7 |
| 5 | SOFTWARE UPDATING | 0→1, 7 | 0→6, 6 | 10→1, 7 | 0→7, 7 | 20→1, 7 |
| 6 | ALERT WARNING | 0→1, 6 | 0→6, 6 | 10→1, 7 | 10→1, 7 | 20→1, 7 |
| 7 | FAILURE | 0→1, 7 | 0→7, 7 | 10→1, 7 | 10→1, 7 | 20→1, 7 |

EACH CELL: [TRANSITION CONDITION (MINUTE)]→
[ESTIMATED STATUS], [FAILED ESTIMATED STATUS]

| PREVIOUS STATUS/ CURRENT STATUS | | ON-LINE | OFF-LINE | REBOOTING | CHANGING NETWORK SETTING | UPDATING SOFTWARE |
|---|---|---|---|---|---|---|
| 1 | ON-LINE | 0→1, 6 | 0→2, 6 | 10→1, 7 | 10→1, 7 | 20→1, 7 |
| 2 | OFF-LINE | 0→1, 6 | 0→2, 6 | 10→1, 7 | 10→1, 7 | 20→1, 7 |
| 3 | REBOOTING | 0→1, 7 | 0→6, 6 | 10→1, 7 | 0→7, 7 | 20→1, 7 |
| 4 | NETWORK SETTING CHANGE | 0→1, 7 | 0→6, 6 | 10→1, 7 | 10→1, 7 | 20→1, 7 |
| 5 | SOFTWARE UPDATING | 0→1, 7 | 0→6, 6 | 10→1, 7 | 0→7, 7 | 20→1, 7 |
| 6 | ALERT WARNING | 0→1, 6 | 0→6, 6 | 10→1, 7 | 10→1, 7 | 20→1, 7 |
| 7 | FAILURE | 0→1, 7 | 0→7, 7 | 10→1, 7 | 10→1, 7 | 20→1, 7 |

EACH CELL: [TRANSITION CONDITION (MINUTE)]→
[ESTIMATED STATUS], [FAILED ESTIMATED STATUS]

FIG. 5

| MONITORING ID | IP ADDRESS | STATUS | ESTIMATED STATUS | TRANSITION CONDITION [min] | FAILED ESTIMATED STATUS |
|---|---|---|---|---|---|
| 1 | 192.168.0.1 | SOFTWARE UPDATING | ON-LINE | 10 | FAILURE |
| 2 | 192.168.0.2 | REBOOTING | ON-LINE | 5 | FAILURE |
| 3 | 192.168.10.2 | NETWORK SETTING CHANGE | ON-LINE | 10 | FAILURE |

FIG. 6

STATUS                              GetStatus¥n

ESTIMATED-STATUS             GetEstimatedStatus¥n

STATUS/ESTIMATED-STATUS     GetStatusAndEstimatedStatus¥n

FIG. 7

STATUS                            RespondToGetStatus, Status=Online¥n
                                       RespondToGetStatus, Status=Online, IPAddr=192.168.1.1, Netmask=255.255.255.0¥n ESTIMATED-STATUS             RespondToGetEstimatedStatus, EstimatedCondition=1min, EstimatedStatus=Online, IllStatus=Trouble¥n STATUS/ESTIMATED-STATUS     RespondToGetStatusAndEstimatedStatus, Status=UpdatingSoftware, EstimatedCondition=10min, EstimatedStatus=Online, IllStatus=Trouble¥n

FIG. 8

REQUEST MESSAGE EXAMPLE
GetStatusAndEstimatedStatus¥n

RESPONSE MESSAGE EXAMPLE 1
RespondToGetStatusAndEstimatedStatus, Status=UpdatingSoftware, EstimatedCondition=10min, EstimatedStatus=Online, IllStatus=Trouble¥n RESPONSE MESSAGE EXAMPLE 2
RespondToGetStatusAndEstimatedStatus, Status=ChangeNetConfig, EstimatedCondition=10min, EstimatedStatus=Online, IllStatus=Trouble, NewIPAddr=192.168.10.2¥n

FIG. 9

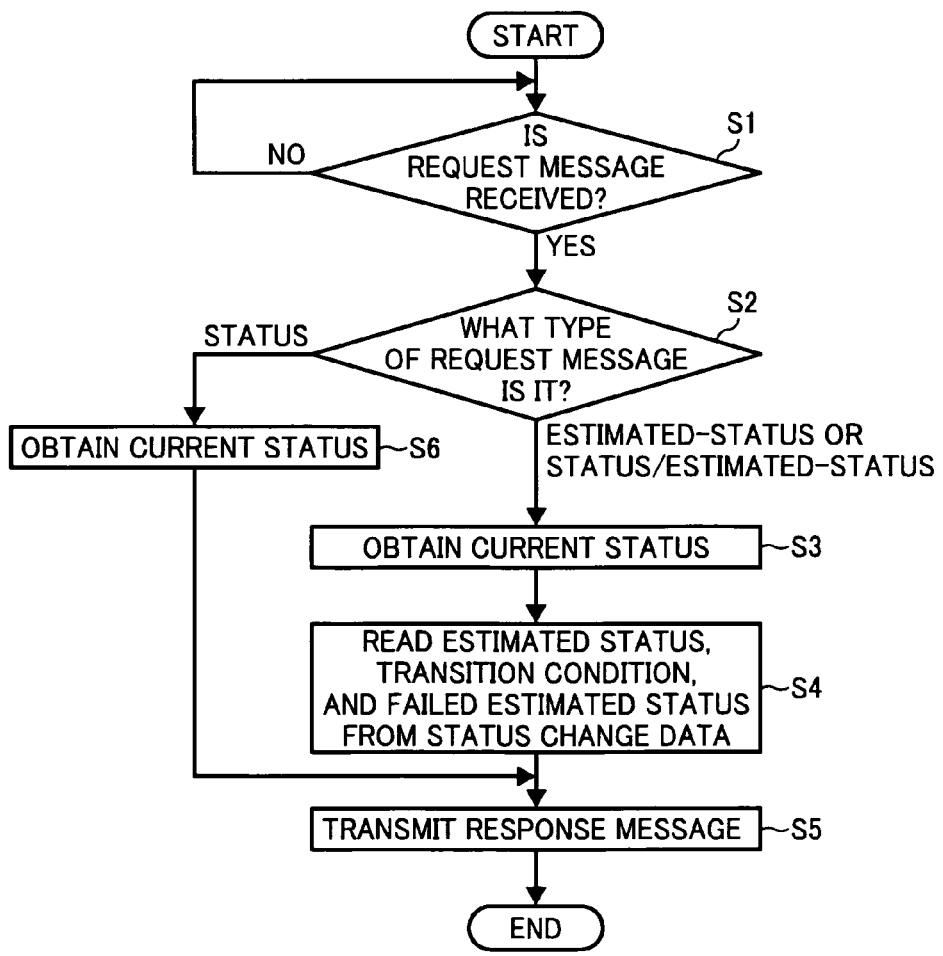

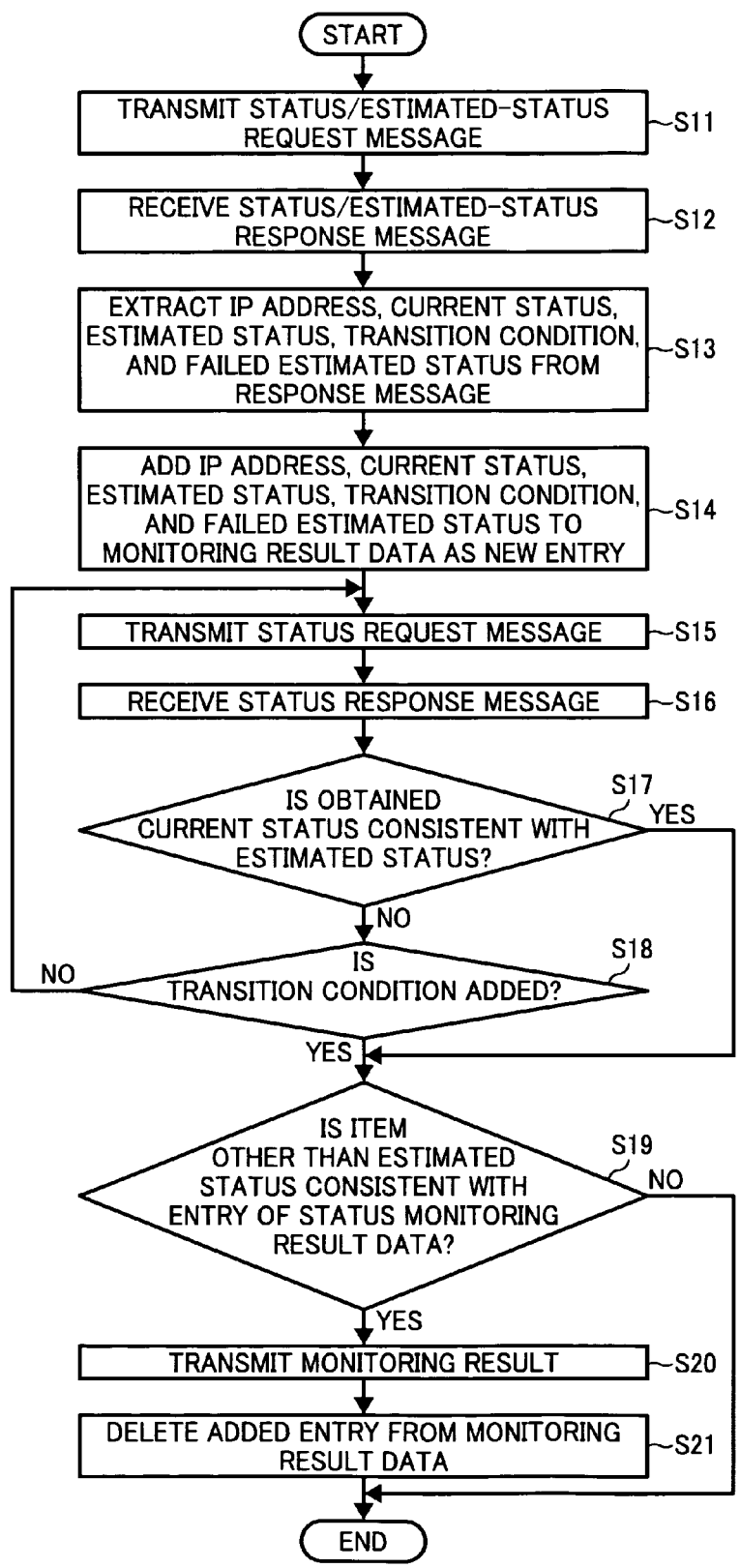

MAIL ADDRESS: admin@xxxxx.co.jp
SENDER ADDRESS: mananger@xxxxx.co.jp
TITLE: NOTIFICATION OF TROUBLE
BODY:
TROUBLE HAS OCCURRED IN UPDATING NETWORK IN APPARATUS [192.168.10.2].
PLEASE CHECK URGENTLY.

| STATUS | ESTIMATED STATUS | DATA |
|---|---|---|
| REBOOTING | ON-LINE | 10 MINUTES |
| UPDATING SOFTWARE | ON-LINE | 20 MINUTES |
| CHANGING NETWORK SETTING | ON-LINE | 10 MINUTES |
| TONER SHORTAGE | NO TONER | 30 PAGES |

ID filed in Japan on Sep. 19, 2006.

IMAGE FORMING APPARATUS, DEVICE MANAGING APPARATUS, DEVICE MANAGING SYSTEM, STATUS ACQUIRING METHOD, DEVICE MANAGING METHOD, AND COMPUTER PROGRAM

CROSS-REFERENCE TO RELATED APPLICATIONS

The present application claims priority to and incorporates by reference the entire contents of Japanese priority document, 2006-253409 filed in Japan on Sep. 19, 2006.

BACKGROUND OF THE INVENTION

1. Field of the Invention

The present invention generally relates to an image forming apparatus, and specifically relates to acquiring status information about status of an image forming apparatus connected to a network and managing the image forming apparatus based on the status information.

2. Description of the Related Art

In recent years, technologies have become available by using which it is possible to manage an image forming apparatus connected to a network. Printers, copiers, scanners, facsimile devices, and multifunction peripherals are examples of the image forming apparatus.

Japanese Patent Application Laid-open No. 2004-234645 discloses a first conventional technology relating to performing software update on an image forming apparatus through a remote operation from a device managing apparatus. Specifically, the device managing apparatus sends a software update instruction and information about a software version by e-mail.

Japanese Patent Application Laid-open No. 2005-115920 discloses a second conventional technology relating to software update on an image forming apparatus. Specifically, a device managing apparatus inquires about a result of software update to the image forming apparatus after elapse of predetermined time.

However, in the first conventional technology, if the image forming apparatus is not in good working order because of a failure of the software update processing, there is likelihood that the image forming apparatus can not receive any e-mail from the device managing apparatus. In such a situation, the device managing apparatus can not determine whether the image forming apparatus has failed in performing the software update processing or whether the software update processing is underway on the image forming apparatus.

In the second conventional technology, the device managing apparatus can surely check the result of the software update processing. However, if the image forming apparatus is performing processing such as rebooting or changing the network setting, the image forming apparatus is temporarily disconnected from the network so that the device managing apparatus can not receive the result from the image forming apparatus.

SUMMARY OF THE INVENTION

It is an object of the present invention to at least partially solve the problems in the conventional technology.

According to an aspect of the present invention, there is provided an image forming apparatus that is connected to a device managing apparatus via a network. The image forming apparatus includes a status acquiring unit that acquires a current status of the image forming apparatus; a status estimating unit that estimates an estimated status that is a status following the current status of the image forming apparatus; and a status transmitting unit that transmits, to the device managing apparatus, the current status, the estimated status, and a transition condition that governs a change of status from the current status to the estimated status.

According to another aspect of the present invention, there is provided a device managing apparatus that is connected to an image forming apparatus via a network and manages the image forming apparatus. The device managing apparatus includes a status receiving unit that receives, from the image forming apparatus, a current status of the image forming apparatus, an estimated status that is a status following the current status of the image forming apparatus, and a transition condition that governs a change of status from the current status to the estimated status; a status monitoring unit that monitors whether a status of the image forming apparatus has changed to the estimated status when the transition condition is satisfied; and an outputting unit that outputs monitoring result obtained by the monitoring unit when a status of the image forming apparatus does not change to the estimated status.

According to still another aspect of the present invention, there is provided a method of acquiring status of an image forming apparatus that is connected to a device managing apparatus via a network. The method includes acquiring a current status of the image forming apparatus; estimating an estimated status that is a status following the current status of the image forming apparatus; and transmitting, to the device managing apparatus, the current status, the estimated status, and a transition condition that governs a change of status from the current status to the estimated status.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining an example of contents of monitoring result data shown in FIG. 4;

FIG. 6 depicts contents of a request message;

FIG. 7 depicts contents of a response message;

FIG. 8 depicts specific examples of a request message and response message;

FIG. 9 is a flowchart of a status acquiring processing performed by the image forming apparatus shown in FIG. 2;

FIG. 10 is a flowchart of a device managing processing performed by the device managing apparatus shown in FIG. 4;

DETAILED DESCRIPTION OF THE PREFERRED EMBODIMENTS

Exemplary embodiments of the present invention are explained in detail below with reference to the accompanying drawings.

Figure 1:
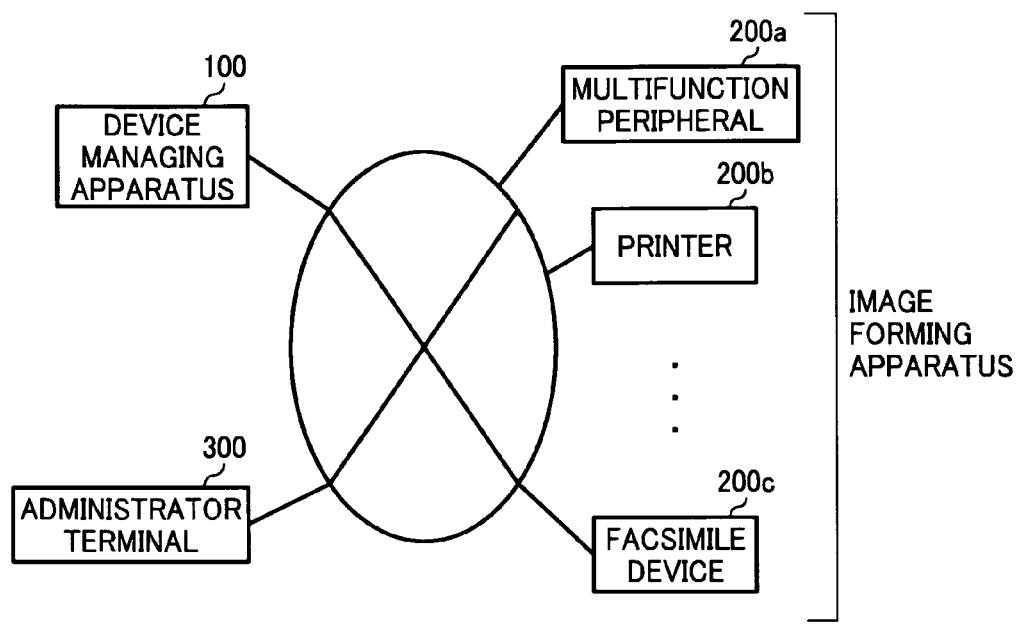
FIG. 1 is a schematic block diagram of a device managing system according to a first embodiment of the present invention.

FIG. 1 is a schematic block diagram of a device managing system according to a first embodiment of the present invention. The device managing system includes a plurality of image forming apparatuses, a device managing apparatus 100 that manages the image forming apparatuses, and an administrator terminal 300 that is used by a system administrator of the device managing apparatus 100. The image forming apparatuses, the device managing apparatus 100, and the administrator terminal 300 are connected to each other via a network such as the Internet or a local area network (LAN). The image forming apparatuses include, for example, a multifunction peripheral 200a, a printer 200b, and a facsimile device 200c. The multifunction peripheral 200a, the printer 200b, and the facsimile device 200c are hereinafter referred to as an image forming apparatus 200.

Figure 2:
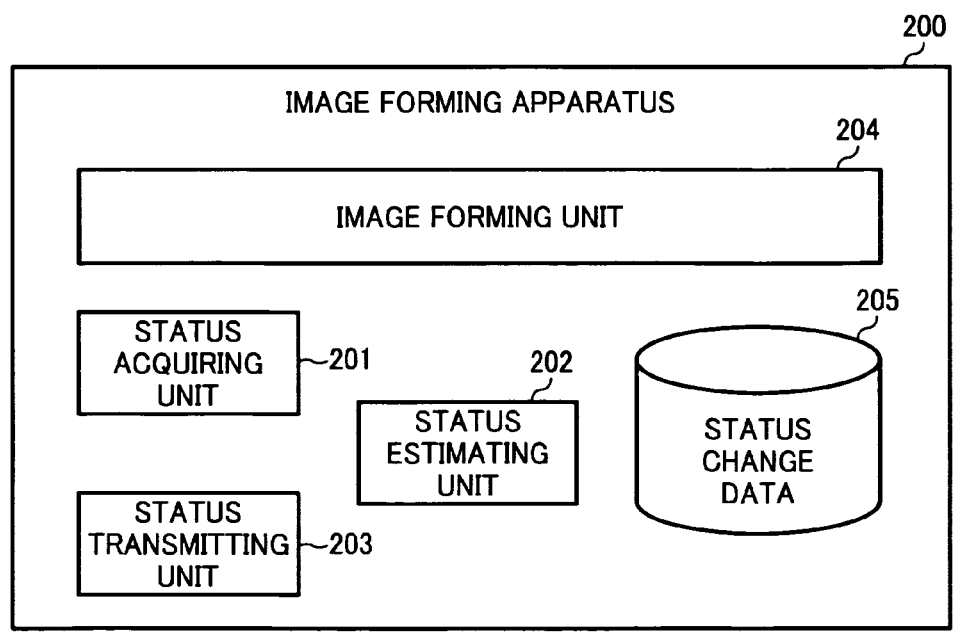
FIG. 2 is a block diagram of a functional configuration of an image forming apparatus shown in FIG. 1.

FIG. 2 is a block diagram of the image forming apparatus 200. The image forming apparatus 200 includes a status acquiring unit 201, a status estimating unit 202, a status transmitting unit 203, an image forming unit 204, and status change data 205.

The image forming unit 204 forms images. More specifically, if the image forming apparatus 200 is a printer, the image forming unit 204 performs print processing. If the image forming apparatus 200 is a scanner, the image forming unit 204 performs scan processing. If the image forming apparatus 200 is a copier, the image forming unit 204 performs both scan and print processing. If the image forming apparatus 200 is a facsimile device, the image forming unit 204 performs both scan and facsimile communication processing. If the image forming apparatus 200 is a multifunction peripheral, the image forming unit 204 performs print processing, scan processing, and facsimile transmission processing.

The status acquiring unit 201 acquires a current status of the image forming apparatus 200. More specifically, the status acquiring unit 201 acquires information about processing conditions of the image forming unit 204, operating conditions, and communication conditions of the image forming apparatus 200 from the image forming apparatus 200. These conditions are cited as follows, on-line, off-line, rebooting, changing network setting, software updating, alert warning, and failure.

The status acquiring unit 201 receives a status request message or a status/estimated-status request message through socket communication from the device managing apparatus 100. The status request message contains a request for sending a current status of the image forming apparatus 200, while the status/estimated-status request message contains a request for sending both a current status and an estimated status of the image forming apparatus 200. Upon receiving a status request message, the status acquiring unit 201 acquires a current status of the image forming apparatus 200 and temporarily stores the current status in a storage medium (not shown). The storage medium has a capacity for storing at least two statuses: a current status and a previous status.

The status estimating unit 202 receives an estimated-status request message and a status/estimated-status request message through socket communication from the device managing apparatus 100. The estimated-status request message contains a request for sending an estimated status of the image forming apparatus 200, while the status/estimated-status request message contains a request for sending both a current status and an estimated status of the image forming apparatus 200. Upon receiving a status request message, the status estimating unit 202 refers to the status change data 205 and estimates an estimated status, which is a status subsequent to the current status, of the image forming apparatus 200 based on the current status acquired by the status acquiring unit 201.

The status change data 205 is data indicative of status changes of the image forming apparatus 200 in a tabular form. The status change data 205 is stored in a storage medium such as a memory or a hard disk drive (HDD).

Figures 3, 4:
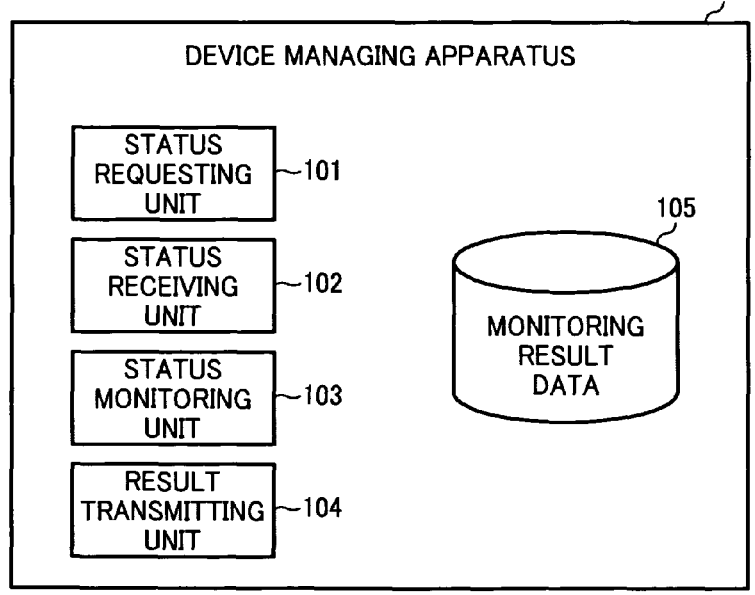
FIG. 3 is a schematic for explaining an example of contents of status change data shown in FIG. 2.
FIG. 4 is a block diagram of a functional configuration of a device managing apparatus shown in FIG. 1.

FIG. 3 is a schematic for explaining an example of contents of the status change data 205. The status change data 205 contains previous statuses in a column and contains current statuses in a row. The numbers corresponding to each of the previous statuses are status numbers for identifying the status. Each cell indicates data in the form of "transition condition→estimated status, failed estimated status". Transition condition is a condition for changing to the subsequent status. In the current embodiment, time that passes from a current status is taken as the transition condition. The failed estimated status is a status to which a transition is made when the image forming apparatus 200 does not change to the estimated status even if the transition condition is satisfied.

For example, the cell that corresponds to the previous status on-line (status number 1) and the current status updating software (status number 5) contains data 20→1, 7. Data 20→1, 7 means that the current status updating software is going to change to on-line status after 20 minutes. The 20 minutes is the transition condition, and the status after elapse of 20 minutes, that is, on-line is the estimated status. When the status does not change to on-line even after elapse of 20 minutes, the status will change to failure (status number 7) as the failed estimated status.

The transition conditions, the estimated statuses, and the failed estimated statuses are determined by the status estimating unit 202 based on the current status and the previous status by referring to the status change data 205.

The status transmitting unit 203 transmits the transition conditions, the estimated statuses, the failed estimated statuses, which are determined by the status estimating unit 202, to the device managing apparatus 100 through socket communication as a response message in response to a request message and a status/estimated-status request message received from the device managing apparatus 100. The status transmitting unit 203 transmits a current status obtained by the status acquiring unit 201 together with an IP address of the image forming apparatus 200 to the device managing apparatus 100 as a response message in response to an estimated-status request message received from the device managing apparatus 100. The status transmitting unit 203 transmits a current status obtained by the status acquiring unit 201 to the device managing apparatus 100 as a response message in response to a status/estimated-status request message received from the device managing apparatus 100. An explanation is given later in detail about the request messages and the response messages.

FIG. 4 is a block diagram of a functional configuration of the device managing apparatus 100. The device managing apparatus 100 includes a status requesting unit 101, a status receiving unit 102, a status monitoring unit 103, a result transmitting unit 104, and monitoring result data 105.

The status requesting unit 101 transmits a status request message, an estimated-status request message, or a status/estimated-status request message through socket communication to the image forming apparatus 200.

The status receiving unit 102 receives a response message, which is received in response to the request message transmitted by the status requesting unit 101, through socket communication. The response message contains a current status, a transition condition, an estimated status, and a failed estimated status. More specifically, the status receiving unit 102 receives a response message that includes a current status in response to a status request message. The status receiving unit 102 receives a response message that includes a transition condition, an estimated status, and a failed estimated status in response to an estimated-status request message. The status receiving unit 102 receives a response message that includes a current status, a transition condition, an estimated status, and a failed estimated status in response to a status/estimated-status request message.

When the status receiving unit 102 receives a transition condition, an estimated status, and a failed estimated status and then the transition condition is satisfied, the status monitoring unit 103 checks whether a current status of the image forming apparatus 200 has changed to the estimated status. More specifically, the status monitoring unit 103 extracts a transition condition, an estimated status, a failed estimated status, and an IP address from the received response messages, registers them in the monitoring result data 105, and determines whether the current status of the image forming apparatus 200 received after elapse of time that is a transition condition is consistent with the estimated status in the monitoring result data 105. In this manner, the status monitoring unit 103 checks whether the current status of the image forming apparatus 200 has changed to the estimated status. To measure a lapse of time, it is suitable to use an inexpensive sensor such as a timer, thereby leading to a reduction of management costs in the image forming apparatus, compared with a case of using another costly sensor.

FIG. 5 is a schematic for explaining an example of contents of the monitoring result data 105. The monitoring result data 105 contains monitoring ID, IP address, status, estimated status, transition condition, and failed estimated status of the image forming apparatus 200 that are extracted from the response message entry by entry. The monitoring result data 105 is stored in a storage medium such as a memory or an HDD.

When it is determined that the current status of the image forming apparatus has not changed to the estimated status, the result transmitting unit 104 generates an e-mail message that informs contents of a failed estimated status as a monitoring result of the image forming apparatus 200, assigns an e-mail address of an administrator of the administrator terminal 300 to the e-mail message, and transmits the e-mail message through socket communication to the administrator. The monitoring result can be informed to the administrator by some other method. For example, the monitoring result can be informed to the administrator on a Web page.

A request message is a message that requests transmission of a current status, an estimated status, and a current and estimated status to the image forming apparatus 200. FIG. 6 depicts contents of a request message.

The status requesting unit 101 is capable of sending three types of request messages to the image forming apparatus 200. The status requesting unit 101 sends a status request message when requesting transmission of a current status. The status requesting unit 101 sends an estimated-status request message when requesting transmission of a transition condition, an estimated status, and a failed estimated status. The status requesting unit 101 sends a status/estimated-status request message when requesting transmission of a current status, a transition condition, an estimated status, and a failed estimated status.

The image forming apparatus 200 that receives a request message from the device managing apparatus 100 sends a response message to the device managing apparatus 100 in response to the request message. FIG. 7 depicts contents of a response message.

The image forming apparatus 200 is capable of sending three types of response messages to the device managing apparatus 100. The image forming apparatus 200 sends a status response message in response to a status request message. The image forming apparatus 200 sends an estimated-status response message in response to an estimated-status request message. The image forming apparatus 200 sends a status/estimated-status request message in response to a status/estimated-status request message.

The status response message includes an IP address of the image forming apparatus 200, which is a requester, and a current status of the image forming apparatus 200. In the status response message shown in FIG. 7, the current status is on-line (Status=Online) and the IP address is 192.168.1.1 (IPAddr=192.168.1.1).

The estimated-status response message includes a transition condition, an estimated status, and a failed estimated status. As shown in FIG. 7, in the estimated-status response message, the transition condition is 1 minute (EstimatedCondition=1 min), the estimated status is on-line (EstimatedStatus=Online), and the failed estimated status is a failure (IllStatus=Trouble).

The status/estimated-status request message includes a current status, a transition condition, an estimated status, and a failed estimated status. When the current status is changing network setting, the response message includes an IP address after the change in the network setting. As shown in FIG. 7, in the status/estimated-status request message, the current status is updating software (Status=UpdatingSoftware), the transition condition is 10 minutes (EstimatedCondition=10 min), the estimated status is on-line (EstimatedStatus=Online), and the failed estimated status is a failure (IllStatus=Trouble).

FIG. 8 depicts a specific example of a request message, and two specific examples of a response message. Example 2 in FIG. 8 is a status/estimated-status response message. It is indicated that the current status is network setting change (Status=ChangeNetConfig), the transition condition is 10 minutes (EstimatedCondition=10 min), the estimated status is on-line (EstimatedStatus=Online), the failed estimated status is a failure (IllStatus=Trouble), and the IP address after network setting change is 192.168.10.2 (NewIPAddr=192.168.10.2).

As described above, in the device managing system, when the device managing apparatus 100 transmits a status request message to the image forming apparatus 200, the image forming apparatus 200 returns a status response message to the device managing apparatus 100. When the device managing apparatus 100 transmits an estimated-status request message to the image forming apparatus 200, the image forming apparatus 200 returns an estimated-status response message to the device managing apparatus 100. When the device managing apparatus 100 transmits a status/estimated-status request message to the image forming apparatus 200, the image forming apparatus 200 returns a status/estimated-status response message to the device managing apparatus 100. As a result, the device managing apparatus 100 can effectively monitor the current status or the estimated status of the image forming apparatus 200.

FIG. 9 is a flowchart of a status acquiring processing performed by the image forming apparatus 200. First, the image forming apparatus 200 waits for reception of a request message from the device managing apparatus 100 (step S1). When receiving the request message (Yes at step S1), the type of request message is checked (step S2). When the request message is a status request message (status at step S2), the status acquiring unit 201 obtains a current status of the image forming apparatus 200 (step S6). The status transmitting unit 203 transmits a status response message to the device managing apparatus 100 (step S5). The status response message contains information about the current status and the IP address of the image forming apparatus 200.

On the other hand, when the request message is an estimated-status request message or a status/estimated-status request message (estimated-status or status/estimated-status at step S2), the status acquiring unit 201 obtains a current status of the image forming apparatus 200 (step S3). The status estimating unit 202 reads, from the status change data 205, an estimated status, a transition condition, and a failed estimated status that correspond to the previous status stored in a memory and the obtained current status (step S4). The status transmitting unit 203 transmits an estimated-status response message when the request message is an estimated-status request message or transmits a status/estimated-status response message when the request message is a status/estimated-status request message to the device managing apparatus 100 (step S5). The estimated-status response message contains information about a transition condition, an estimated status, and a failed estimated status. The status/estimated-status response message contains information about a current status, an IP address, a transition condition, an estimated status, and a failed estimated status.

FIG. 10 is a flowchart of a device managing processing performed by the device managing apparatus 100. The status requesting unit 101 transmits a status/estimated-status request message to the image forming apparatus 200 (step S11). In response to the status/estimated-status request message, the status receiving unit 102 receives a status/estimated-status response message from the image forming apparatus 200 (step S12).

The status monitoring unit 103 extracts an IP address, a current status, an estimated status, a transition condition, and a failed estimated status from the status/estimated-status response message (step S13) and adds the obtained current status, estimated status, transition condition, and failed estimated status to the monitoring result data 105 with a monitoring ID as a new entry (step S14).

If the response message shown as Example 2 in FIG. 8 is received at step S13, because the current status is changing network setting (Status=ChangeNetConfig), the transition condition is 10 minutes (EstimatedCondition=10 min), the estimated status is on-line (EstimatedStatus=Online), the failed estimated status is a failure (IllStatus=Trouble), and the IP address after network setting change is 192.168.10.2 (NewIPAddr=192.168.10.2), such information is added to the monitoring result data 105 as a new entry while an IP address is taken as an IP address after a network is changed. In this case, the information is added to the monitoring result data 105 as indicated in an entry of a monitoring ID=3 of FIG. 5.

Then, the status requesting unit 101 transmits a status request message to the image forming apparatus 200 (step S15). In response to the status request message, the status receiving unit 102 receives a status response message from the image forming apparatus 200 (step S16). The status monitoring unit 103 checks whether the current status included in the received status response message is consistent with the estimated status of the entry added to the monitoring result data 105 (step S17).

If the current status is inconsistent with the estimated status (No at step S17), it is checked whether a transition condition is added (step S18). More specifically, an entry is added to the monitoring result data 105 at step S14 before it is checked whether time as a transition condition passes. Then, when time does not pass and a transition condition is not added (No at step S18), processing at steps S15 to S17 is repeated.

Figures 11, 12:
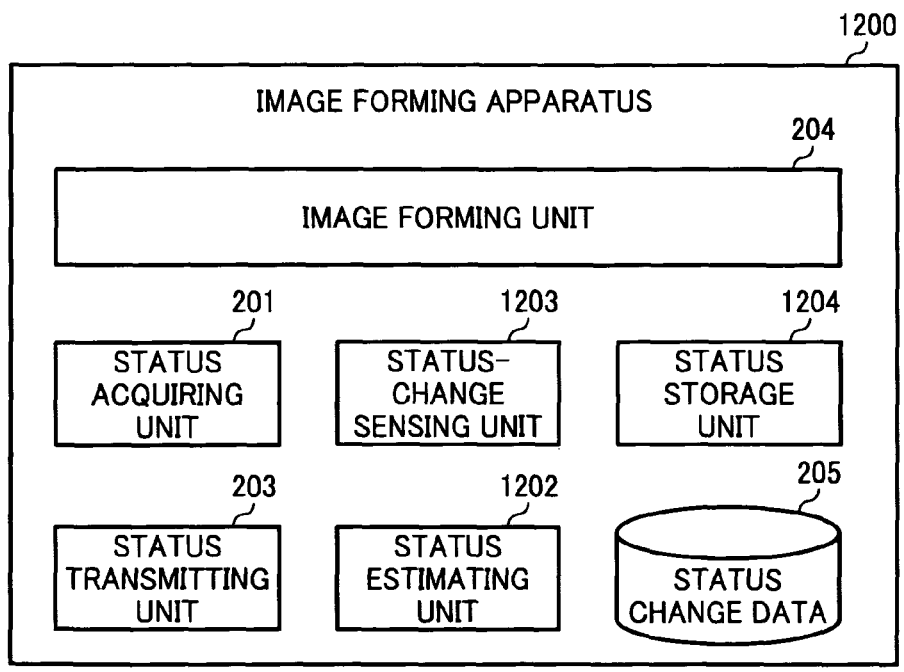
FIG. 11 depicts contents of an e-mail that includes a monitoring result as an example.
FIG. 12 is a block diagram of a functional configuration of an image forming apparatus according to a second embodiment of the present invention.

On the other hand, when time passes and a transition condition is added at step S18 (Yes at step S18) and when the current status included in the response message received at step S16 is consistent with the estimated status in the added entry of the monitoring result data 105 at step S17 (Yes, step S17), it is checked whether an item except an estimated status of the response message, that is, a failed estimated status is consistent with the entry added to the monitoring result data 105 (step S19). When the failed estimated status is consistent with the entry, an e-mail message to which an address of an administrator who uses the administrator terminal 300 is assigned is transmitted while contents of the failed estimated status are taken as the monitoring result (step S20). FIG. 11 depicts contents of an e-mail message that includes a monitoring result as an example. The entry added at step S14 is deleted from the monitoring result data 105 (step S21).

For example, when the request message in Example shown in FIG. 8 is transmitted at step S11 and the response message in Example 1 shown in FIG. 8 is received at step S13, a current status is updating software, a transition condition is 10 minutes, an estimated status is on-line, and a failed estimated status is a failure. Thus, until 10 minutes passes since an entry is added to the monitoring result data 105 (No at step S18), it is checked at step S17 whether a current status in the response message received at step S16 is consistent with on-line of an estimated status. After elapse of 10 minutes from addition of an entry to the monitoring result data 105 (Yes at step S18), it is checked at step S19 whether a current status in the response message received at step S16 is a failure of a failed estimated status. When the current status is a failure, the monitoring result of the failure is transmitted to an administrator by e-mail message.

In the device managing system, the image forming apparatus 200 obtains a current status, an estimated status, a failed estimated status, and a transition condition from the status change data 205 and transmits them to the device managing apparatus 100. The device managing apparatus 100 receives the current status, the estimated status, the failed estimated status, and the transition condition from the image forming apparatus 200 and checks whether the current status of the image forming apparatus 200 after fulfillment of the transition condition is added changes to an estimated status. When the current status of the image forming apparatus 200 after the transition condition is added does not change to an estimated status, it is determined as a failed estimated status that is a designated status and the monitoring result is transmitted to an administrator. Therefore, even if the image forming apparatus 200 is temporarily unable to communicate with the device managing apparatus 100, the device managing apparatus 100 can reliably obtain information about the current status of the image forming apparatus 200.

As a result, the device managing apparatus 100 can simultaneously manage a plurality of image forming apparatuses 200, thereby enabling a reduction of time to restore a failure of the image forming apparatus 200 and an increase of management efficiency of the image forming apparatus 200.

In a second embodiment of the present invention, when an image forming apparatus senses a change of its own status, the image forming apparatus transmits the current status to a device managing apparatus.

Figure 13:
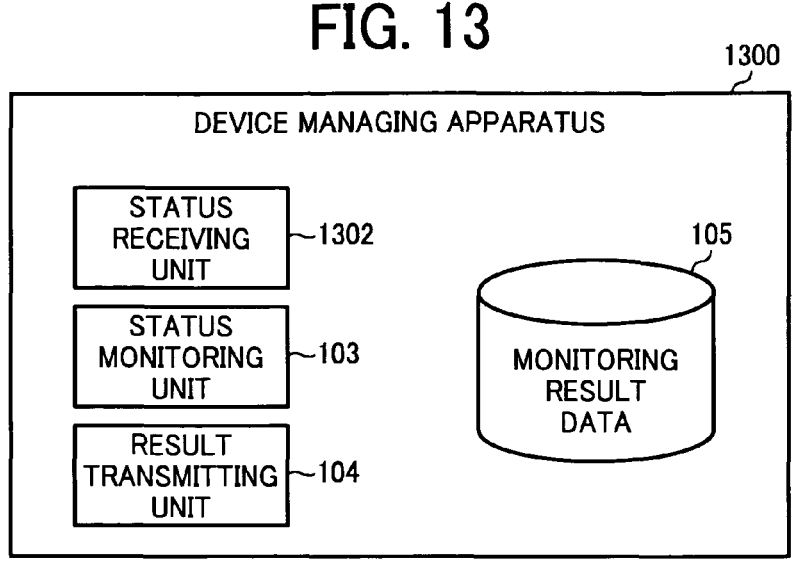
FIG. 13 is a block diagram of a functional configuration of a device managing apparatus according to the second embodiment.

A device managing system according to the second embodiment has the same network configuration as that shown in FIG. 1. However, an image forming apparatus 1200 shown in FIG. 12 is employed instead of the image forming apparatus 200, and a device managing apparatus 1300 shown in FIG. 13 is employed instead of the device managing apparatus 100. FIG. 12 is a block diagram of the image forming apparatus 1200. The image forming apparatus 1200 includes the status acquiring unit 201, a status estimating unit 1202, a status-change sensing unit 1203, the status transmitting unit 203, the image forming unit 204, the status change data 205, and a status storage unit 1204. The status acquiring unit 201, the status estimating unit 1202, and the status transmitting unit 203 have the same or similar configurations and the same or similar functions as in the image forming apparatus 200.

The status acquiring unit 201 and the status estimating unit 1202 do not wait for receiving any request message from the device managing apparatus 1300. In other words, the status acquiring unit 201 and the status estimating unit 1202 acquire a current status or an estimated status of the image forming apparatus 1200 of their own when the status-change sensing unit 1203 senses a change in the current status of the image forming apparatus 1200.

Before communication can not be performed via a network prior to start of processing of updating software, changing network setting, and rebooting, the status transmitting unit 203 transmits the obtained information through socket communication to the device managing apparatus 1300.

The status storage unit 1204 is a storage medium such as a memory or an HDD that temporarily stores a current status obtained by the status acquiring unit 201.

The status-change sensing unit 1203 senses a change in the current status of the image forming apparatus 1200. More specifically, because the previous status is temporarily stored in the status storage unit 1204, it is checked whether the previous status is consistent with the current status acquired by the status acquiring unit 201 and it is determined that a change in the status has occurred when they are not consistent.

FIG. 13 is a block diagram of the device managing apparatus 1300. The device managing apparatus 1300 includes a status receiving unit 1302, the status monitoring unit 103, the result transmitting unit 104, and the monitoring result data 105. The status monitoring unit 103, the result transmitting unit 104, and the monitoring result data 105 have the same or similar configuration and the same or similar function as in the first embodiment.

The status receiving unit 1302, only when the current status of the image forming apparatus 1200 changes, receives a current status, an estimated status, a transition condition, and a failed estimated status as a message. In other words, unlike in the first embodiment, by transmitting a request message the device managing apparatus does not get a current status, an estimated status, a transition condition, and a failed estimated status in a response message. Therefore, the device managing apparatus 1300 does not include a status requesting unit.

Figure 14:
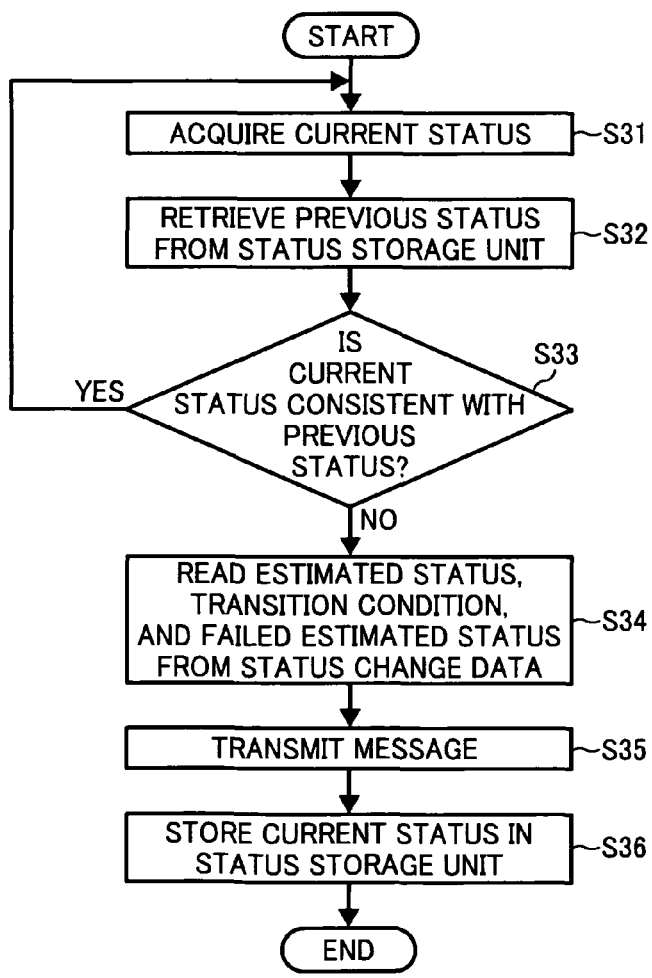
FIG. 14 is a flowchart of a status acquiring processing performed by the image forming apparatus shown in FIG. 12.

FIG. 14 is a flowchart of a status acquiring processing performed by the image forming apparatus 1200. First, the status acquiring unit 201 acquires a current status (step S31). The status-change sensing unit 1203 retrieves the previous status from the status storage unit 1204 (step S32). The status-change sensing unit 1203 compares the current status with the previous status and checks whether they agree each other (step S33).

If both of them agree each other (Yes at step S33), the system control is returned to step S31. On the other hand, when they do not agree (No at step S33), the status estimating unit 1202 reads an estimated status, a transition condition, and a failed estimated status that correspond to the previous status stored in the status storage unit 1204 and an obtained current status from the status change data 205 (step S34).

The estimated status, the transition condition, and the failed estimated status are included in a message, which is transmitted to the device managing apparatus 1300 (step S35). Then, the status acquiring unit 201 stores the current status in the status storage unit 1204 (step S36).

Figure 15:
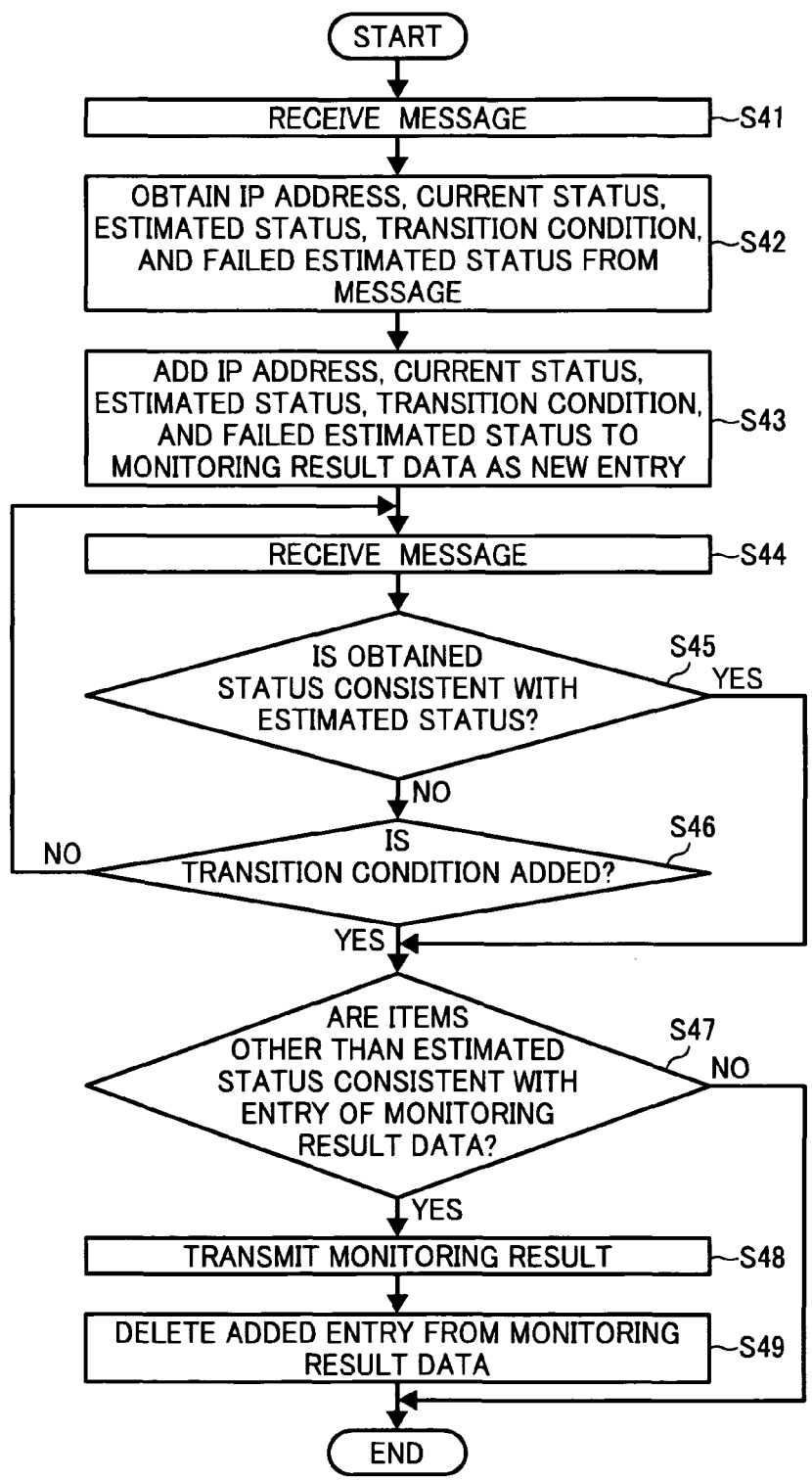
FIG. 15 is a flowchart of a device management processing performed by the device managing apparatus shown in FIG. 13.

FIG. 15 is a flowchart of a device management processing performed by the device managing apparatus 1300. When the status receiving unit 1302 receives a message from the image forming apparatus 1200 (step S41), the status monitoring unit 103 obtains an IP address, a current status, an estimated status, a transition condition, and a failed estimated status from the received message (step S42) and adds, to the monitoring result data 105, the IP address, the current status, the estimated status, the transition condition, and the failed estimated status that are obtained as a new entry with a monitoring ID attached (step S43).

When the status receiving unit 1302 receives a message from the image forming apparatus 1200 (step S44), the status monitoring unit 103 checks whether a current status included in the received message is consistent with an estimated status of the added entry in the monitoring result data 105 (step S45).

When they do not agree (No at step S45), it is checked whether a transition condition is added (step S46). When time does not pass and a transition condition is not added (No at step S46), the processing at steps S44 and S45 is repeated.

On the other hand, when, at step S46, time passes and a transition condition is added (Yes at step S46) and when, at step S45, a current status included in the received message at step S44 is consistent with an estimated status of the entry added to the monitoring result data 105 (Yes at step S45), it is checked whether items other than an estimated status of the message, that is, a transition condition and a failed estimated status are consistent with the entry added to the monitoring result data 105 (step S47). The following processing (steps S48 and S49) is performed in the same manner as in device management processing at steps S20 and S21 according to the first embodiment.

Thus, the image forming apparatus 1200 senses its status change, because the image forming apparatus 1200 has already transmitted a current status and an estimated status to the device managing apparatus 1300, it is unnecessary to transmit a request message, in addition to effects of the device managing system according to the first embodiment, thereby leading to a reduction of network traffic.

In the device managing system according to the first and second embodiments, the image forming apparatus estimated the status following the current status by using the status change data. However, in an image forming apparatus according to a third embodiment of the present invention, a log of the changes in the status is created and status log data indicative of the log is used to estimate the following status.

A device managing system according to a third embodiment has the same network configuration as that shown in FIG. 1. However, an image forming apparatus 1600 shown in FIG. 16 is employed instead of the image forming apparatus 200, while the device managing apparatus 100 shown in FIG. 4 is employed as it is.

Figures 16, 17:
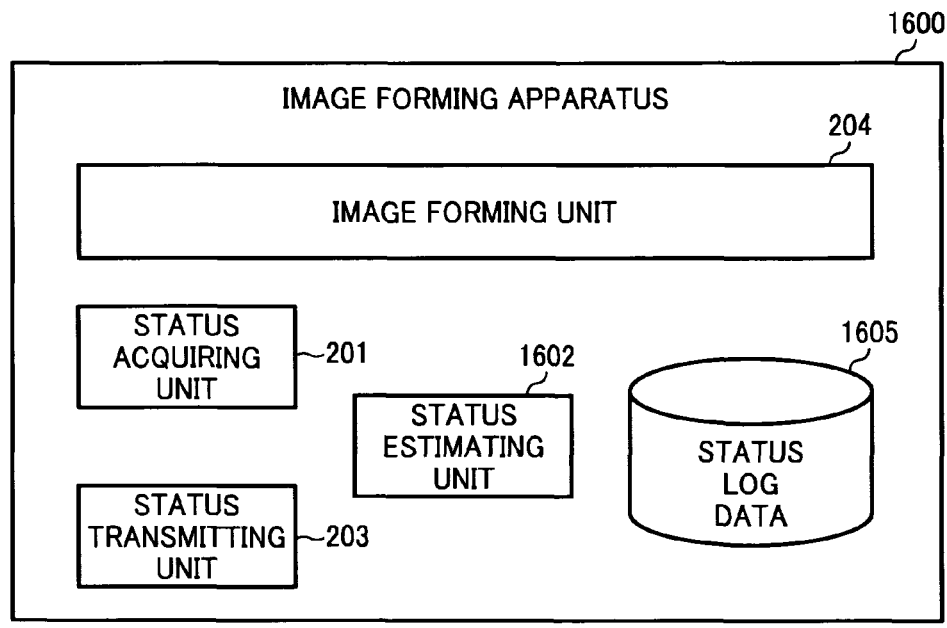
FIG. 16 is a block diagram of a functional configuration of an image forming apparatus according to a third embodiment of the present invention.
FIG. 17 is a schematic for explaining an example of contents of status log data shown in FIG. 16.

FIG. 16 is a block diagram of the image forming apparatus 1600. The image forming apparatus 1600 includes the status acquiring unit 201, a status estimating unit 1602, the status transmitting unit 203, the image forming unit 204, and status log data 1605. The status acquiring unit 201 and the status transmitting unit 203 have the same or similar configurations and the same or similar functions as in the image forming apparatus 200.

The status log data 1605 is a log of changes in the status of the image forming apparatus 1600 and is stored in a storage medium such as a memory or an HDD.

FIG. 17 is a schematic for explaining contents of the status log data 1605 as an example. The status log data 1605 contains, for example, status, estimated status, and some data. The data includes time required for the status change or the number of printed pages.

The status estimating unit 1602 determines the estimated status, which is that status following the current status, based on the status log data 1605. When determining the estimated status, the data is used as a transition condition. For example, in an example of the status log data 1605 in FIG. 17, it is determined that after 10 minutes from rebooting, the current status rebooting will change to the estimated status on-line. It is also determined that when printing of 30 pages is performed since a status of toner shortage, the current status toner shortage will change to the estimated status no toner. The status transmitting unit 203 transmits the current status, the estimated status, and the data through socket communication to the device managing apparatus 100.

Figure 18:
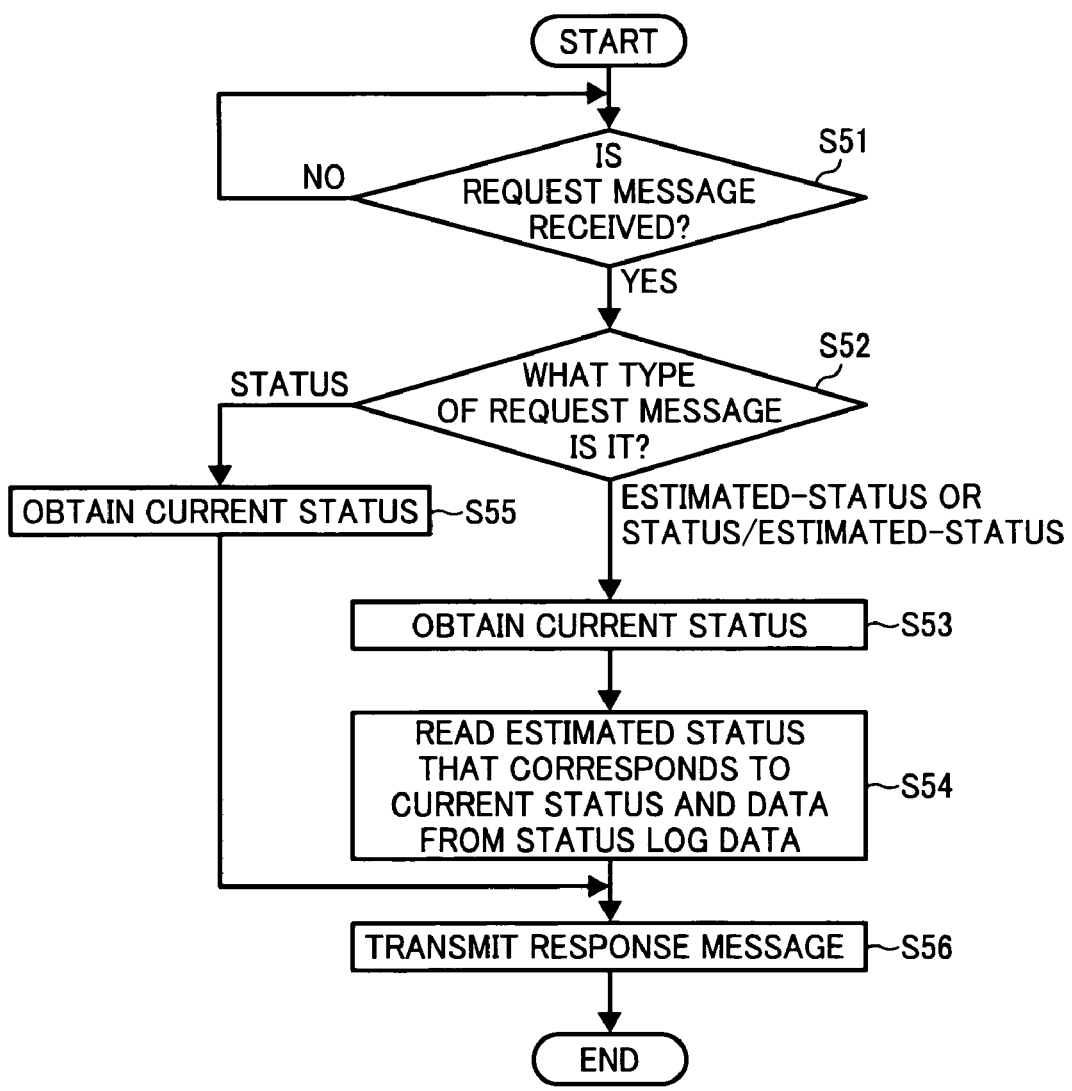
FIG. 18 is a flowchart of a status acquiring processing performed by the image forming apparatus shown in FIG. 16.

FIG. 18 is a flowchart of a status acquiring processing performed by the image forming apparatus 1600. The third embodiment is different in status acquiring processing from the first embodiment in that, at step S54, the status estimating unit 1602 reads an estimated status that corresponds to an obtained current status and data from the status log data 1605 and, at step S56, the status transmitting unit 203 transmits the read current status, the estimated status, and the data to the device managing apparatus 100. Processing at the other steps is the same as the corresponding ones in the first embodiment.

As described above, in the image forming apparatus 1600, the following status is estimated based on the status log data 1605. Therefore, the device managing apparatus can reliably and more accurately acquire information about the status of the image forming apparatus.

Figure 19:
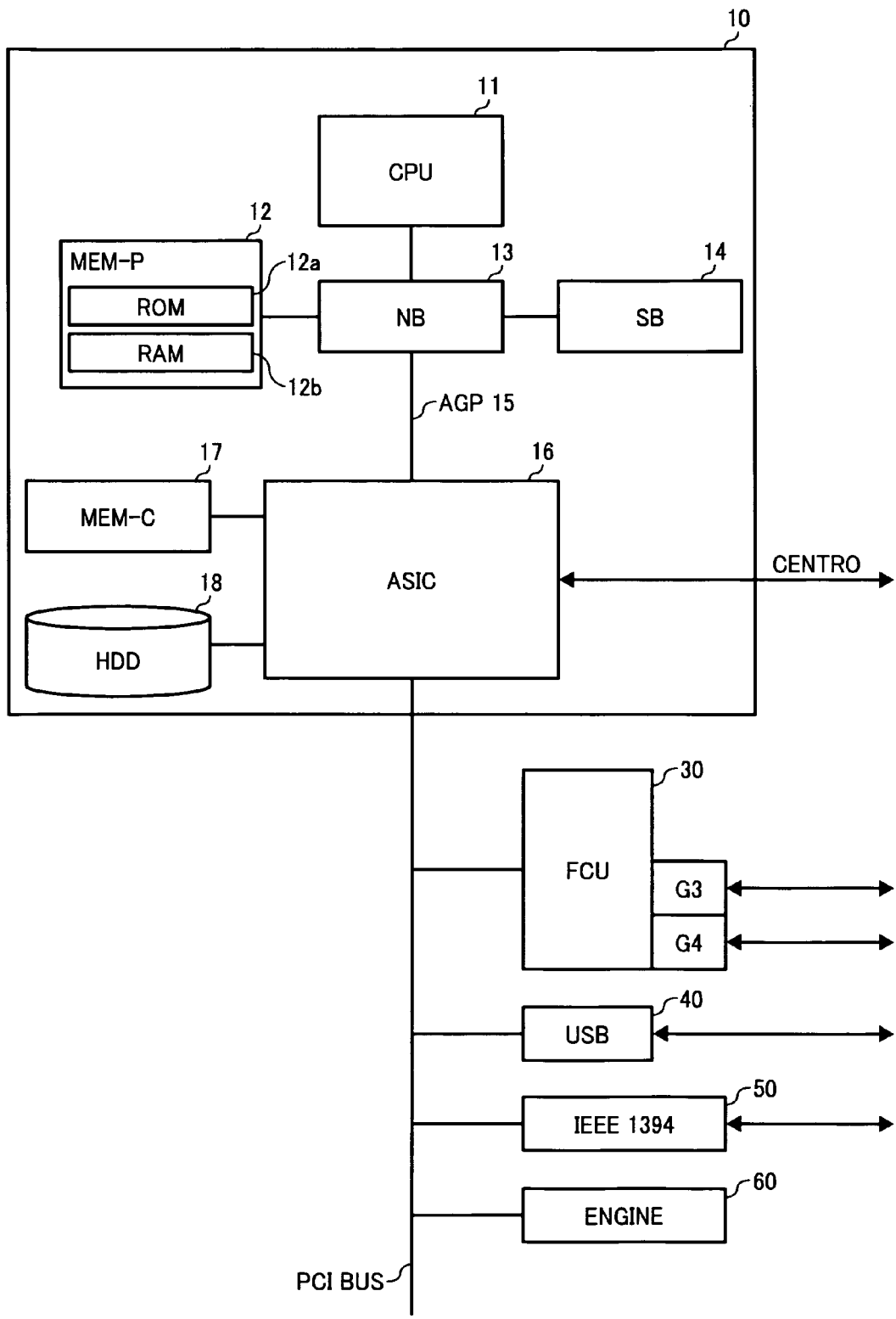
FIG. 19 is a block diagram of a hardware configuration of the image forming apparatuses according to the first to third embodiments.

FIG. 19 is a block diagram of a hardware configuration of the image forming apparatuses 200, 1200, and 1600. In the image forming apparatuses 200, 1200, and 1600, a controller 10 and an engine unit (Engine) 60 are connected to each other through a peripheral component interconnect (PCI) bus. The controller 10 controls the image forming apparatuses 200, 1200, and 1600 and painting, communication, and input from an operation unit (not shown). The engine unit 60 is a printer engine that can be connected to the PCI bus such as a black and white plotter, a one-drum color plotter, a 4-drum color plotter, a scanner, or a fax unit. Besides an engine such as a plotter, image processing such as error diffusion and gamma-conversion is included in the engine unit 60.

The controller 10 includes a CPU 11, a north bridge (NB) 13, a system memory (MEM-P) 12, a south bridge (SB) 14, a local memory (MEM-C) 17, an application specific integrated circuit (ASIC) 16, and an HDD 18. The NB 13 and the ASIC 16 are connected through an accelerated graphics port (AGP) bus 15. The MEM-P 12 includes a read only memory (ROM) 12a and a random access memory (RAM) 12b.

The CPU 11 controls the image forming apparatuses 200, 1200, and 1600, has a chip set that includes the NB 13, the MEM-P 12, and the SB 14, and is connected through the chip set to other devices.

The NB 13 is a bridge that connects the CPU 11, the MEM-P 12, the SB 14, and the AGP 15 and includes a memory controller that controls read and write operations from and to the MEM-P 12, a PCI master, and an AGP target.

The MEM-P 12 is a system memory used as a memory for storing a program or data, a memory for developing a program or data, and a memory for painting in a printer. The ROM 12a is a memory only for reading as a memory to store a program or data. The RAM 12b is a memory capable of writing and reading to develop a program or data or to print in a printer.

The SB 14 is a bridge for connecting the NB 13, a PCI device (not shown), and a peripheral device and is connected through the PCI bus to the NB 13. A network interface (I/F) unit is also connected to the PCI bus.

The ASIC 16 is an integrated circuit (IC) for image processing applications that has a hardware component for image processing and serves as a bridge for connecting the AGP 15, the PCI bus, the HDD 18, and the MEM-C 17 respectively. The ASIC 16 includes a PCI unit that performs data transfer through the PCI bus among a PCI target, an AGP master, an arbiter (ARB) that works as a central function of the ASIC 16, a memory controller for controlling the MEM-C 17, a plurality of direct memory access controllers (DMAC) that rotates image data by a hardware logic, and the engine unit 60. The ASIC 16 is connected through the PCI bus to a fax control unit (FCU) 30, a universal serial bus (USB) 40, and the institute of electrical and electronics engineers (IEEE) 1394 interface 50.

The MEM-C 17 is a local memory used as a copy image buffer and a code buffer. The HDD 18 is a storage that stores image data, a program, font data, and a form.

The AGP 15 is a bus interface for a graphics accelerator card, which is proposed to accelerate graphics processing and accelerates the graphics accelerator card by directly making access to the MEM-P 12 with a high throughput.

A get-status program implemented by the image forming apparatuses 200, 1200, and 1600 according to the first to third embodiments is previously incorporated in a ROM or the like and provided.

The get-status program implemented by the image forming apparatuses 200, 1200, and 1600 according to the first to third embodiments can be recorded in a recording medium that can be read by a personal computer (PC) such as a compact disk read only memory (CD-ROM), a flexible disk (FD), a compact disk recordable (CD-R), and a digital versatile disk (DVD) in a form of an installable or executable file and provided.

The get-status program implemented by the image forming apparatuses 200, 1200, and 1600 according to the first to third embodiments can be stored in a PC connected to a network such as the Internet and provided by downloading it via the network. Moreover, the get-status program implemented by the image forming apparatuses 200, 1200, and 1600 according to the first to third embodiments can be provided or distributed via a network such as the Internet.

The get-status program implemented by the image forming apparatuses 200, 1200, and 1600 according to the first to third embodiments can be formed as a module that includes the above units (the status acquiring unit, the status estimating unit, the status transmitting unit, the image forming unit, and the status-change sensing unit). The get-status program is read from the ROM by the CPU (processor) as actual hardware for implementation. Then, each of the units are downloaded on the main storage device and the status acquiring unit, the status estimating unit, the status transmitting unit, the image forming unit, and the status-change sensing unit are generated on the main storage device.

The device managing apparatuses 100, 1300 according to the first to the third embodiments includes the controller such as a CPU, the storage device such as a ROM and a RAM, an external storage device such as an HDD and a CD drive device, a display device, and an input device such as a key board and a mouse and is constituted of hardware by using a normal PC.

A device managing program implemented by the device managing apparatuses 100, 1300 according to the first to the third embodiments is recorded in a recording medium capable of reading by a PC in a file that can be installed or can be executed such as a CD-ROM, an FD, a CD-R, and a DVD and provided.

The device managing program implemented by the device managing apparatuses 100, 1300 according to the first to the third embodiments can be stored in a PC connected to a network such as the Internet, downloaded via the network, and provided. Moreover, the device managing program implemented by the device managing apparatuses 100, 1300 according to the first to the third embodiments can be provided or distributed via a network such as the Internet.

The device managing program implemented by the device managing apparatuses 100, 1300 according to the first to the third embodiments can be previously incorporated in a ROM or the like and provided.

The device managing program implemented by the device managing apparatuses 100, 1300 according to the first to the third embodiments is constituted of a module that includes the above units (the status requesting unit, the status receiving unit, the status monitoring unit, and the status transmitting unit). The device managing program is read from the storage medium by the CPU (processor) as actual hardware for implementation. Then, each of the units is downloaded on the main storage device and the status requesting unit, the status receiving unit, the status monitoring unit, and the status transmitting unit are generated on the main storage device.

The present invention is not limited to the embodiments and can be embodied by converting components within a range of not departing from the gist in an implementation phase. Various inventions can be made based on any combination of a plurality of components disclosed in the embodiments. For example, some components can be removed from all of the components in the embodiments. Moreover, components in different embodiments can be appropriately combined.

According to an aspect of the present invention, when image forming apparatus can not temporarily communicate with the device managing apparatus, because the image forming apparatus gets a current status of its own, estimates an estimated status that is the following status of the image forming apparatus, and transmits the current status, the estimated status, and a transition condition for changing from the current status to the estimated status to the device managing apparatus, the device managing apparatus can reliably acquire the current status of the image forming apparatus.

According to another aspect of the present invention, when the device managing apparatus can not temporarily communicate with the image forming apparatus, because the device managing apparatus receives a current status of the image forming apparatus, an estimated status that is the following status of the image forming apparatus, and a transition condition for changing from the current status to the estimated status from the image forming apparatus, monitors, if the transition condition is satisfied, whether the image forming apparatus changes to the estimated status, and outputs, if the image forming apparatus does not change to the estimated status, the monitoring result of the image forming apparatus, the device managing apparatus can reliably acquire the current status of the image forming apparatus. Furthermore, the device managing apparatus can monitor management of a plurality of image forming apparatuses at the same time, thereby enabling a reduction of time to restore a failure and an increase of management efficiency in the image forming apparatus.

According to still another aspect of the present invention, a transition condition is time that passes until changing from the current status to the estimated status, thereby reducing management costs of the image forming apparatus by use of an inexpensive sensor such as a timer.

According to still another aspect of the present invention, the image forming apparatus estimates an estimated status based on an obtained current status and a status change data in which a current status is associated with an estimated status and a transition condition, thereby enabling easy and accurate estimation of changes in the status of each image forming apparatus.

According to still another aspect of the present invention, the image forming apparatus estimates an estimated status based on an obtained current status and status log data that is the previous recording of a current status, an estimated status, and a transition condition, thereby enabling easy and accurate estimation of changes in the status of each image forming apparatus.

According to still another aspect of the present invention, the image forming apparatus receives a status request message from the device managing apparatus to obtain a current status and receives an estimated-status request message from the device managing apparatus to obtain an estimated status, thereby enabling determination of the current status and the estimated status at an accurate timing.

According to still another aspect of the present invention, the image forming apparatus senses a change in its own status and, when the image forming apparatus senses the change, estimates an estimated status that is the following status of the image forming apparatus, thereby causing a reduction of network traffic.

According to still another aspect of the present invention, the device managing apparatus transmits a status request message to the image forming apparatus and receives a current status, an estimated status, and a transition condition as a response message from the image forming apparatus, which corresponds to the request message, thereby leading to monitoring of the status of the image forming apparatus at an accurate timing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that is connected to a device managing apparatus via a network, the image forming apparatus comprising:
   a storing unit to store at least one status of the image forming apparatus;
   a status acquiring unit to acquire a current status of the image forming apparatus;
   a status estimating unit to estimate an estimated status that is a status of the image forming apparatus after expiration of a time interval from the current status of the image forming apparatus, the estimated status based on the current status and a status stored in the storing unit prior to the current status; and
   a status transmitting unit to transmit, to the device managing apparatus, the current status, the estimated status, a failed estimated status, and the time interval,
   wherein the storing unit is configured to store status change data in which a plurality of different current statuses, estimated statuses, failed estimated statuses, and time intervals are associated with each other, and
   the status estimating unit is configured to estimate the estimated status and the failed estimated status based on the current status and the status change data.

2. The image forming apparatus according to claim 1, wherein
   the storing unit is configured to store status log data that is a log to associate a plurality of different current statuses, estimated statuses, and time intervals with one another, and
   the status estimating unit is configured to estimate the estimated status based on the current status and the status log data.

3. The image forming apparatus according to claim 1, wherein
   the status acquiring unit is configured to receive a request message from the device managing apparatus and to obtain the current status, and
   the status estimating unit is configured to receive an estimated-status request message from the device managing apparatus and to estimate the estimated status.

4. The image forming apparatus according to claim 1, further comprising:
   a status sensing unit configured to sense a change in a status of the image forming apparatus,
   wherein the status estimating unit is configured to estimate the estimated status when the status sensing unit senses a change in a status of the image forming apparatus.

5. A device managing apparatus that is connected to an image forming apparatus via a network and manages the image forming apparatus, the device managing apparatus comprising:
   a storing unit to store at least one status of the image forming apparatus;
   a status receiving unit to receive, from the image forming apparatus,
      a current status of the image forming apparatus,
      an estimated status that is a status of the image forming apparatus after expiration of a time interval from the current status of the image forming apparatus, the estimated status based on the current status and a status stored in the storing unit prior to the current status,
      a failed estimated status that is an alternative status to the estimated status after the expiration of the time interval from the current status of the image forming apparatus, and
      the time interval;
   a status monitoring unit to monitor whether a status of the image forming apparatus has changed to one of the estimated status and the failed estimated status after the expiration of the time interval;
   an outputting unit to output a monitoring result obtained by the monitoring unit when a status of the image forming apparatus does not change to the estimated status; and
   a status requesting unit to transmit a request message to the image forming apparatus,
   wherein the status receiving unit is configured to receive the current status, the estimated status, the failed estimated status, and the time interval as a response message from the image forming apparatus in response to the request message.

6. The device managing apparatus according to claim 5, wherein the outputting unit is configured to transmit the monitoring result to an administrator terminal that is connected to a network.

7. A method of acquiring status of an image forming apparatus that is connected to a device managing apparatus via a network, the image forming apparatus executing:
   storing, by a storing device, at least one status of the image forming apparatus and status change data, the status change data being data in which a plurality of different current statuses, estimated statuses, failed estimated statuses, and time intervals are associated with each other;
   acquiring a current status of the image forming apparatus;
   estimating an estimated status that is a status of the image forming apparatus after expiration of a time interval from the current status of the image forming apparatus, the estimating of the estimated status based on the current status and the status change data;
   estimating a failed estimated status that is an alternative status to the estimated status after the expiration of the time interval from the current status of the image forming apparatus, the estimating of the failed estimated status based on the current status and the status change data; and
   transmitting, to the device managing apparatus, the current status, the estimated status, and the time interval that governs a change of status from the current status to the estimated status.

8. The image forming apparatus according to claim 1, wherein the time interval from the current status of the image forming apparatus is an interval of time from registering of the current status to monitoring result data by the device managing apparatus.

9. A device managing apparatus that is connected to an image forming apparatus via a network and manages the image forming apparatus, the device managing apparatus comprising:
   a storing unit to store at least one status of the image forming apparatus;
   a status receiving unit to receive, from the image forming apparatus,
      a current status of the image forming apparatus,
      an estimated status that is a status of the image forming apparatus after expiration of a time interval from the current status of the image forming apparatus, the estimated status based on the current status and a status stored in the storing unit prior to the current status, a failed estimated status that is an alternative status to the estimated status after the expiration of the time interval from the current status of the image forming apparatus, and the time interval;

a status monitoring unit to monitor whether a status of the image forming apparatus has changed to one of the estimated status and the failed estimated status after the expiration of the time interval; and an outputting unit to output a monitoring result obtained by the monitoring unit when a status of the image forming apparatus does not change to the estimated status, wherein the estimated status and the failed estimated status are based on the current status and status change data, the status change data being data in which a plurality of different current statuses, estimated statuses, failed estimated statuses, and time intervals are associated with each other.

* * * * *